(12) United States Patent
Yi et al.

(10) Patent No.: US 9,372,299 B1
(45) Date of Patent: Jun. 21, 2016

(54) HOLLOW-CORE FIBER LAMP

(71) Applicant: The United States of America as Represented by the Administrator of NASA, Washington, DC (US)

(72) Inventors: Lin Yi, Monterey Park, CA (US); Robert L. Tjoelker, La Crescenta, CA (US); Eric A. Burt, Sierra Madre, CA (US); Shouhua Huang, Arcadia, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/624,682

(22) Filed: Feb. 18, 2015

Related U.S. Application Data

(60) Provisional application No. 61/941,963, filed on Feb. 19, 2014.

(51) Int. Cl.
| | |
|---|---|
| *H01J 7/24* | (2006.01) |
| *H05B 31/26* | (2006.01) |
| *F21V 8/00* | (2006.01) |
| *G02B 3/00* | (2006.01) |
| *H01J 65/04* | (2006.01) |
| *H05H 1/46* | (2006.01) |
| *G02B 6/10* | (2006.01) |

(52) U.S. Cl.
CPC ............ *G02B 6/0008* (2013.01); *G02B 3/0087* (2013.01); *G02B 6/0006* (2013.01); *G02B 6/10* (2013.01); *H01J 65/042* (2013.01); *H05H 1/46* (2013.01); *H05H 2001/4652* (2013.01)

(58) Field of Classification Search
None
See application file for complete search history.

(56) References Cited

U.S. PATENT DOCUMENTS

2014/0048410 A1* 2/2014 Benabid ............ G02B 6/02328
204/157.43

OTHER PUBLICATIONS

N. Denisova et al, "A study of capillary discharge lamps in AR-Hg and Xe-Hg mixtures," J, Phys. D: Appl. Phys. 44 (2011) 155201.*
R. L. Tjoelker et al., "A Mercury Ion Frequency Standard Engineering Prototype for the NASA Deep Space Network," Proceedings of the 1996 IFCS, pp. 1073-1081 (IEEE 1996).
Todd Ely et al., "The deep space atomic clock: ushering in a new paradigm for radio navigation and science." 23rd AAS/AIAA Space Flight Mechanics Meetings, AAS 13-325 (2013).
E. A. Burt et al., "A Compensated Multi-pole Linear Ion Trap Mercury Frequency Standard for Ultra-Stable Timekeeping," IEEE Trans. Ultrason, Ferroelec, Freq. Control 55, pp. 2586-2595 (2008).
Lin Yi et al., Eric A. Burt, Shouhua Huang, and Robert L. Tjoelker, "Trapped mercury ion spectroscopy using sub-mm scale optical fiber guided deep ultra-violet optical source," ICOLS 2013, Berkeley, CA, USA (2013).

(Continued)

*Primary Examiner* — Anh Tran
(74) *Attorney, Agent, or Firm* — Mark Homer

(57) ABSTRACT

Hollow-core capillary discharge lamps on the mm or sub-mm scale are provided. The hollow-core capillary discharge lamps achieve an increased light intensity ratio between 194 mm (useful) and 254 mm (useless) light than conventional lamps. The capillary discharge lamps may include a cone to increase light output. Hollow-core photonic crystal fiber (HCPCF) may also be used.

18 Claims, 11 Drawing Sheets

(56) References Cited

OTHER PUBLICATIONS

R. L. Tjoelker et al., "Record frequency stability with mercury in a linear ion trap," Proc. of the 1995 Symp. on Frequency Standards and Metrology (1995).
N. Denisova et al., "A study of capillary discharge lamps in Ar—Hg and Xe—Hg mixtures," J. Phys. D: Appl. Phys. 44 155201 (2011).
K. H. Becker et al., "Micro-plasmas and applications", J. Phys. D. Appl. Phys. 39 R55-70 (2006).
John C. Travers et al., "Ultrafast nonlinear optics in gas-filled hollow-core photonic crystal fibers." J. Opt. Soc. Am. B 26 A11 (2011).
Davide Mariotti et al., "Microplasmas for nanomaterials synthesis," J. Phys. D: Appl. Phys. 43 323001 (2010).
M. G. Kong et al., "Plasma medicine: an introductory review," New J Phys 11 115012 (2009).
Vassili Karanassios, "Microplasmas for chemical analysis analytical tools or research toys?" Spectrochimica Acta Part B 59, pp. 909-928 (2004).
A.P. Papadakis et al., "Microplasmas: A Review," The Open Applied Physics Journal, 4, pp. 45-63 (2011).
Deep UV Discharge Lamps in Capillary Quartz Tubes with Light Output Coupled to an Optical Fiber, Technology Brief for NASA New Technology Report 46845, http://www.techbriefs.com/component/content/article/9-ntb/tech-briefs/physical-sciences/19918 (published Jun. 1, 2014).

* cited by examiner

200

600

1000

HOLLOW-CORE FIBER LAMP

CROSS-REFERENCE TO RELATED APPLICATION

This application claims the benefit of U.S. Provisional Patent Application Ser. No. 61/941,963, filed Feb. 19, 2014. The subject matter of this earlier-filed application is hereby incorporated by reference in its entirety.

ORIGIN OF THE INVENTION

Embodiments of the present invention described herein were made in the performance of work under NASA contract NAS7-03001 and are subject to the provisions of Public Law #96-517 (35 U.S.C. §202) in which the Contractor has elected not to retain title.

FIELD

The present invention generally pertains to lamps, and more particularly, to hollow-core capillary discharge lamps that are compatible with fiber integration.

BACKGROUND

The mercury linear ion trap frequency standards (LITS) at NASA Jet Propulsion Laboratory have been demonstrated with applications in NASA deep space missions. In particular, the long-term stability and practicality of the ground-based clock LITS9 have attracted significant interest for ground-based time-keeping and metrology. However, the mercury radio frequency (RF) discharge lamp and the associated optical design used in these clocks for optical pumping and detection may limit the short-term stability of the clock, which consequently constrains use in broader applications, such as global navigation satellite systems, time and frequency metrology, academic pursuits studying the fundamental laws of physics, etc.

An increase of vacuum ultraviolet (VUV) light output from the plasma discharge lamp light source used in trapped ion clock atomic state preparation and detection should improve the clock signal-to-noise ratio (SNR) and decrease optical pumping times. Both lead to an improvement in short-term clock stability and/or enable the use of a local oscillator having lower cost and improved performance. Accordingly, an improved lamp that increases SNR and decreases optical pumping times may be beneficial.

SUMMARY

Certain embodiments of the present invention may be implemented and provide solutions to the problems and needs in the art that are outside the capabilities of conventional RF discharge lamps, such as mercury RF discharge lamps. For instance, some embodiments pertain to a hollow-core capillary discharge lamp that achieves increased light intensity output and a higher SNR than conventional lamps. In some embodiments, the capillary discharge lamp may include a cone to increase light intensity output. In certain embodiments, hollow-core photonic crystal fiber (HCPCF) may be used.

In one embodiment, an apparatus includes a capillary tube comprising a hollow inner section. The hollow inner section has a diameter of one millimeter or less. The apparatus also includes a plasma source contained within the hollow inner section and a buffer gas contained within the hollow inner section at a predetermined pressure.

In another embodiment, an apparatus includes a capillary tube including a hollow inner section and a plasma source contained within the hollow inner section. The apparatus also includes a buffer gas contained within the hollow inner section at a predetermined pressure and a cone-shaped waveguide located within the hollow inner section proximate to where plasma is generated by the plasma source. The apparatus further includes a DUV/VUV optical fiber operably connected to an end of the capillary tube. The optical fiber is configured to receive light generated by the plasma source and guide the light through the optical fiber for use.

In yet another embodiment, a HCPCF lamp includes a vacuum sealed hollow core housing a plasma source and a buffer gas at a predetermined pressure. The HCPCF lamp also includes DUV/VUV optical fiber operably connected to an end of the hollow core and a plurality of air hole structures surrounding the hollow core.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to mm or sub-mm scale hollow-core capillary discharge lamps. In certain embodiments, these lamps may be compatible with fiber integration for the LITS imaging system. Deep ultraviolet (DUV) and vacuum ultraviolet (VUV) radiation is emitted via an optical fiber integrated with the capillary in these lamps. Mercury may be used for light generation, but any other suitable element and/or gas may be used in some embodiments, such as Rb, Cs, Yb, Cd, He, Ne, Ar, Kr, Xe, N, H, metal halides, etc.

Fiber Integration in Capillary Lamps 194 nm VUV discharge lamps in LITS systems require bulky imaging optics systems to filter/reject the unwanted light emanating from the lamp. Reliable, smaller, and longer life 194 nm light sources may benefit broad ion clock applications. Less complicated light delivery mechanisms from the lamp to the trapped ions that do not compromise SNR would reduce size, complexity, and cost.

Figure 1:
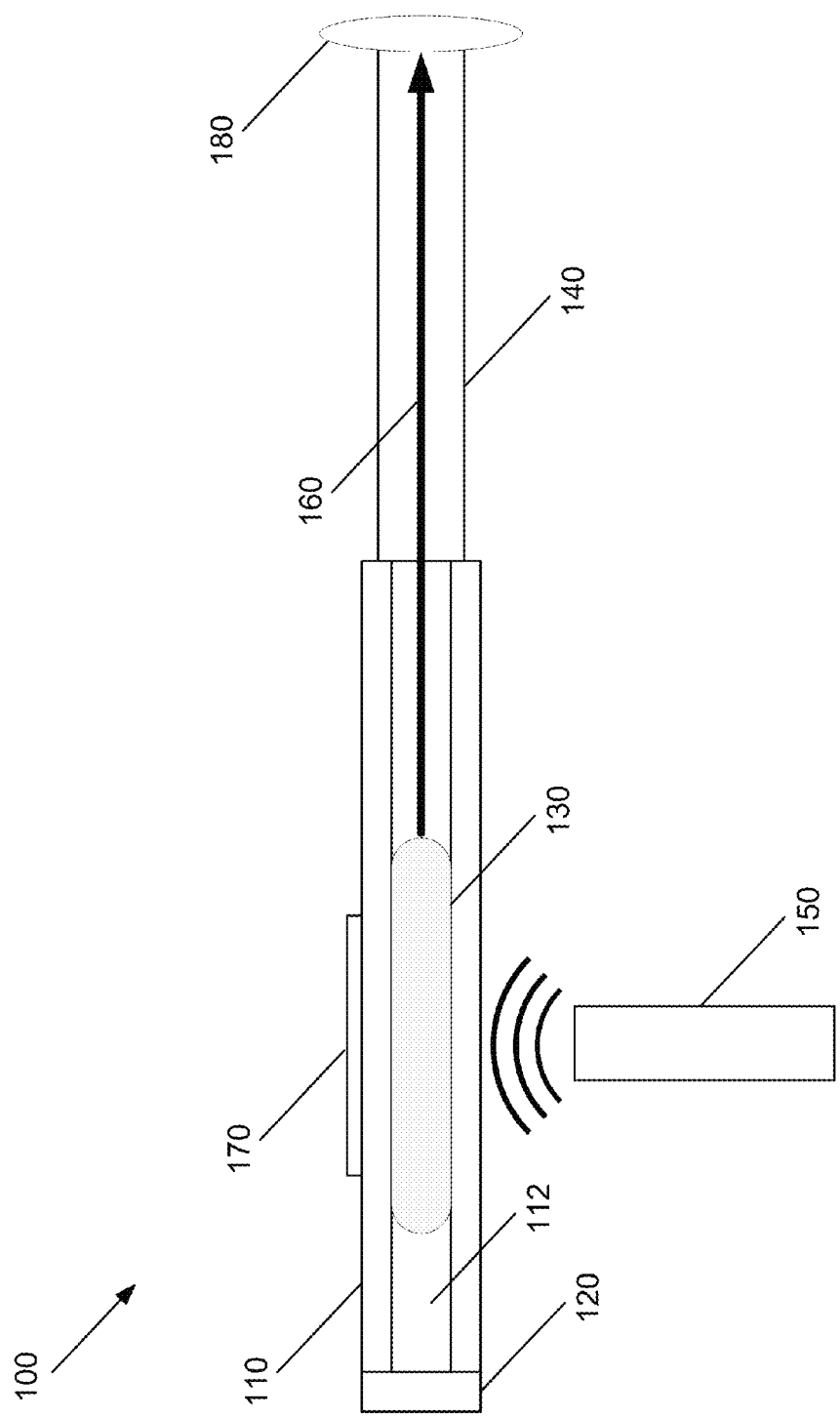
FIG. 1 is a side cutaway view illustrating a hollow-core mercury discharge fiber lamp, according to an embodiment of the present invention.

Some embodiments simplify the 194 nm light source and optical guidance in mercury LITS, for example. FIG. 1 is a side cutaway view illustrating a hollow-core mercury discharge fiber lamp 100, according to an embodiment of the present invention. Lamp 100 includes a capillary tube 110 having a diameter of a few hundred microns. This is in contrast to conventional lamp bulbs, which have a diameter of approximately 10 mm. Capillary tube 110 includes a hollow section 112 housing mercury 120. A cap 130 seals one end of capillary tube 110, and a piece of large-core DUV/VUV step-index optical fiber 140 is fused or otherwise operably connected to the other end of capillary tube 110.

Energy is applied to mercury 120 via an energy source 150, generating mercury plasma from mercury 120 inside hollow section 112. DUV/VUV light 160 emitted by the mercury plasma is guided through optical fiber 140 for practical use. For instance, light 160 may be guided directly to clock ions held in an ion trap (not shown) in a vacuum system via optical fiber 140.

In this embodiment, argon gas is also sealed in hollow section 112 with mercury 120. However, any suitable gas may be used, such as krypton, neon, nitrogen, etc. Also, other plasma generators may be used, such as rubidium, cesium, ytterbium, cadmium, or any other suitable material. If another material is used, the pressure of the gas should be modified accordingly to achieve a suitable SNR.

In this embodiment, mercury plasma is generated inside capillary tube 110 with externally applied RF or microwave power from energy source 150. Inductive coils or surface strip electrodes 170 can be used as an RF or microwave inductive/capacitive resonator to sustain the plasma. A gradient-index lens 180 is located at the output tip of optical fiber 140 to deliver the condensed and quasi-collimated light to ions of a clock, for example. The fiber output can be brought close to the ion trap assembly and coupled via a DUV/VUV window or fiber feed-through (not shown). Alternatively the microplasma and delivery assembly could be placed entirely in the ion trap vacuum (not shown).

Figure 2:
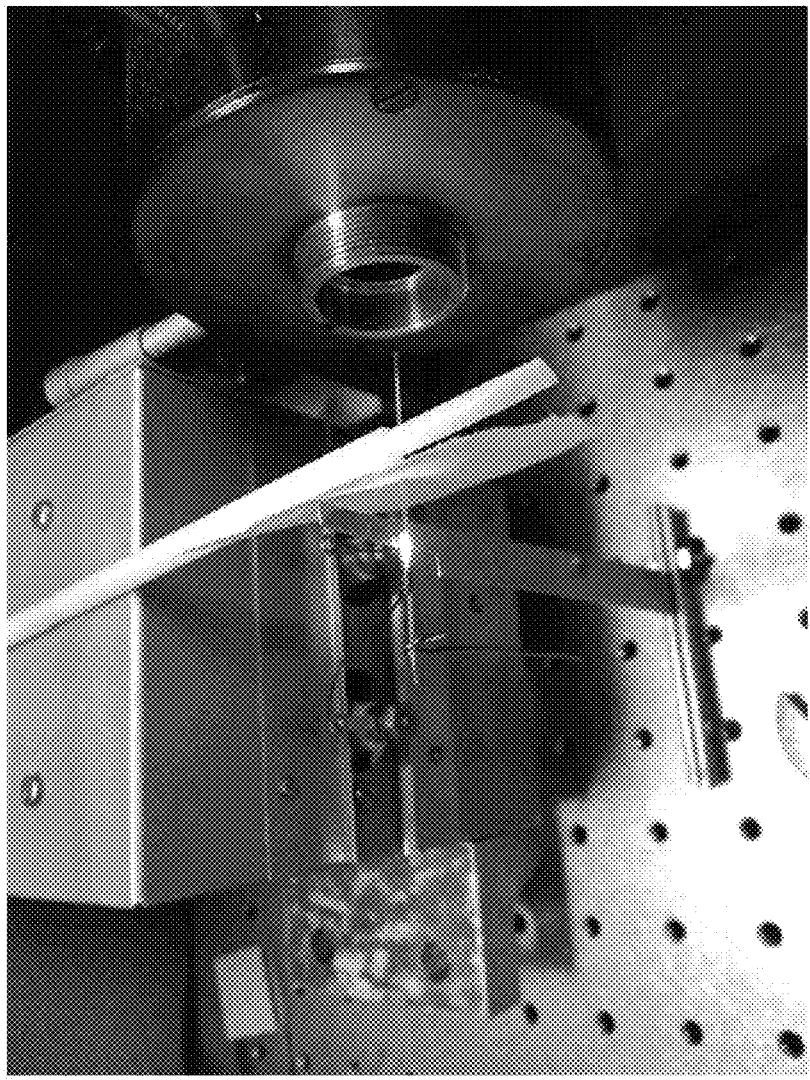
FIG. 2 is a photograph illustrating a prototype hollow-core mercury discharge fiber lamp, according to an embodiment of the present invention.

FIG. 2 is a photograph 200 illustrating a prototype hollow-core mercury discharge fiber lamp, according to an embodiment of the present invention. Mercury plasma (the bright glowing light in the center of photograph 200) is generated in a capillary tube with an inner diameter of 250 microns. The capillary is fused with a DUV/VUV fiber to deliver light out to the right.

Figure 3:
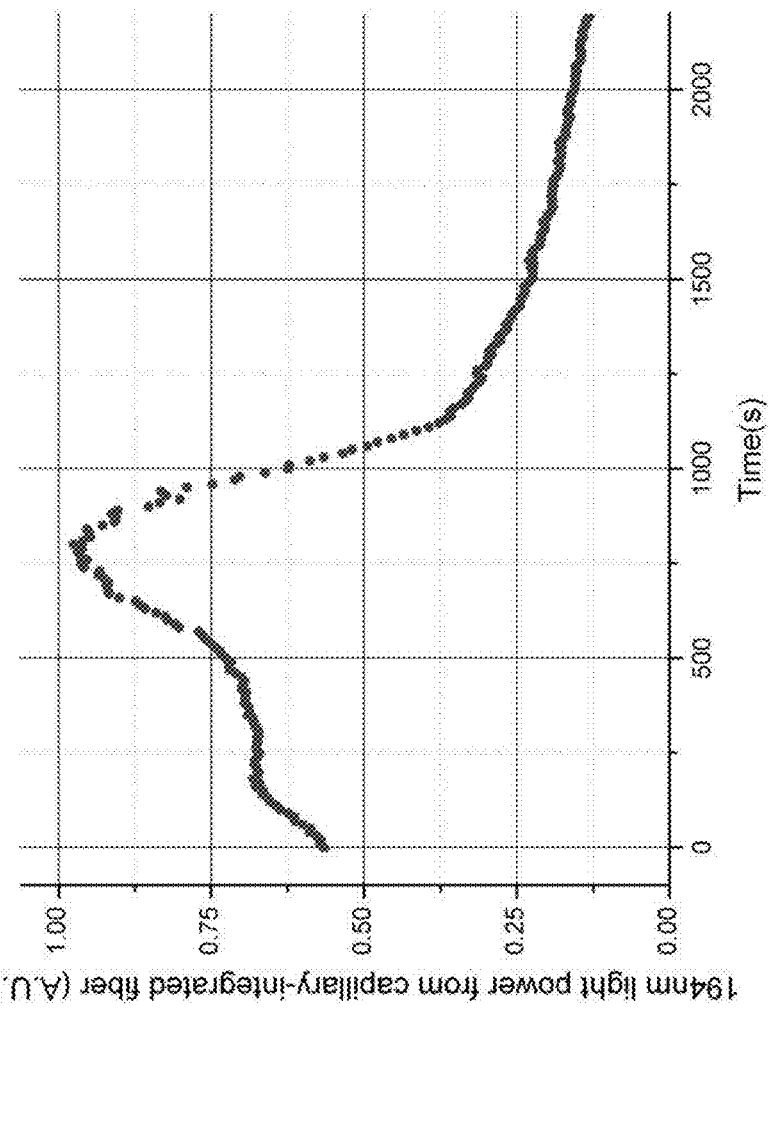
FIG. 3 is a graph illustrating DUV/VUV photon counts as a function of time, according to an embodiment of the present invention.

To test the prototype lamp, a DUV/VUV grating was used to separate the 194 nm light from the rest of the lamp radiation. A photomultiplier tube was used to record the DUV/VUV photon counts as a function of time. The resultant DUV/VUV radiation lifetime is shown in graph 300 of FIG. 3, which plots atomic units (A.U.) on the y-axis and time in seconds on the x-axis. In the prototype, the capillary-fiber manifold is only filled to the saturation pressure of the metallic mercury rather than directly sealing metallic mercury inside. As a result, the DUV capillary lamp has a short lifetime due to an insufficient amount of mercury. Lifetimes exceeding three years have been demonstrated in larger mercury bulbs when fabricated with a macroscopic quantity of mercury, so practical applications should be able to achieve longer lifetimes. This phenomenon is well known in the lamp industry and is well documented in rubidium discharge lamps for rubidium atomic clocks. DUV/VUV degradation of the fiber itself is ruled out by the specifications provided by the fiber manufacturer.

DUV Spectrum Control in Capillary Lamps

The short-term stability of the clock is largely determined by the SNR. For mercury 194 nm applications, the SNR depends on the optical spectrum quality of the 194 nm source. The spectrum quality is determined by the power ratio of the useful radiation from the mercury ions (194 nm) to the useless radiation from the neutral mercury atoms (254 nm) inside the bulb. Using a current lamp fabrication method at JPL, the 194/254 power ratio is only about 1/50, as demonstrated in graph 400 of FIG. 4. More specifically, graph 400 shows the DUV/VUV spectrum for conventional lamps with a 10 mm inner diameter and argon buffer gas at 1.0 Torr with a bulk resonator. To increase the ratio conventionally, it is necessary to apply additional spectrum filtering using DUV/VUV coatings, which may increase system complexity and cost. These coatings can also degrade with time when exposed to DUV/VUV light, limiting the lifetime of the instrument.

However, the 194/254 power ratio and the entire DUV/VUV spectrum from the lamp can be controlled by changing the geometry of the bulb, the pressure of argon buffer gas, the amount of mercury in the plasma, the optical coupling, and the configuration of related RF electronics. As a result, smaller capillary lamps may be produced, which reduce the need for optical coatings, simplify the optical system, and lower the cost of a clock, for example, without sacrificing performance.

Figure 4:
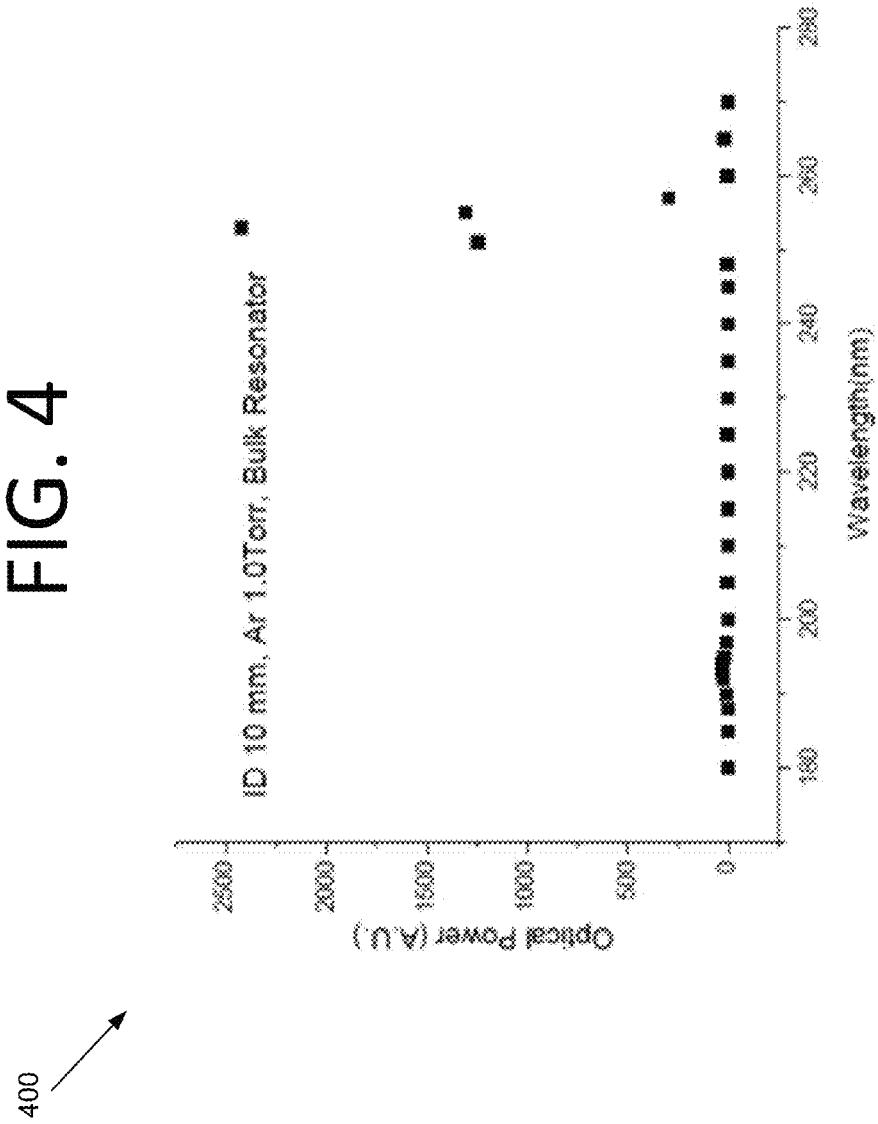
FIG. 4 is a graph illustrating optical power at a range of wavelengths for a conventional 10 mm mercury bulb.
Figure 5:
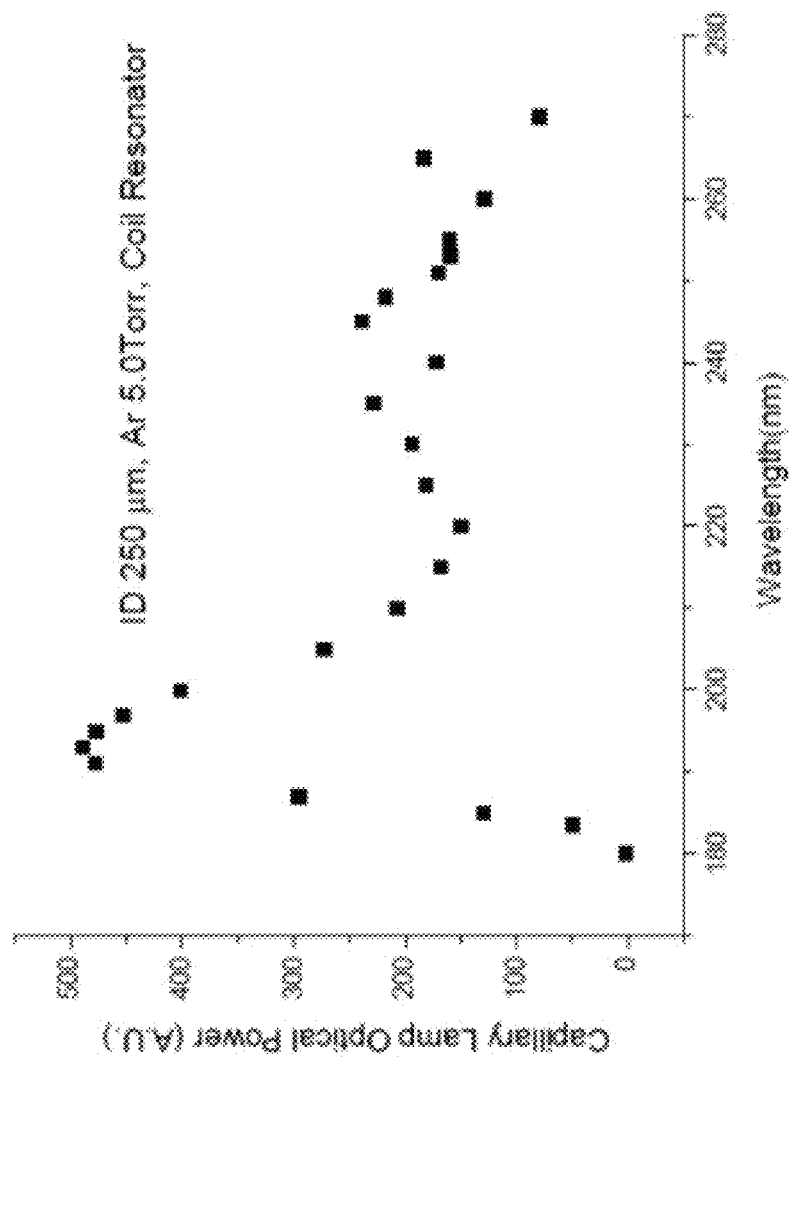
FIG. 5 is a graph illustrating optical power at a range of wavelengths for a 250 nm mercury capillary lamp, according to an embodiment of the present invention.
Figure 6:
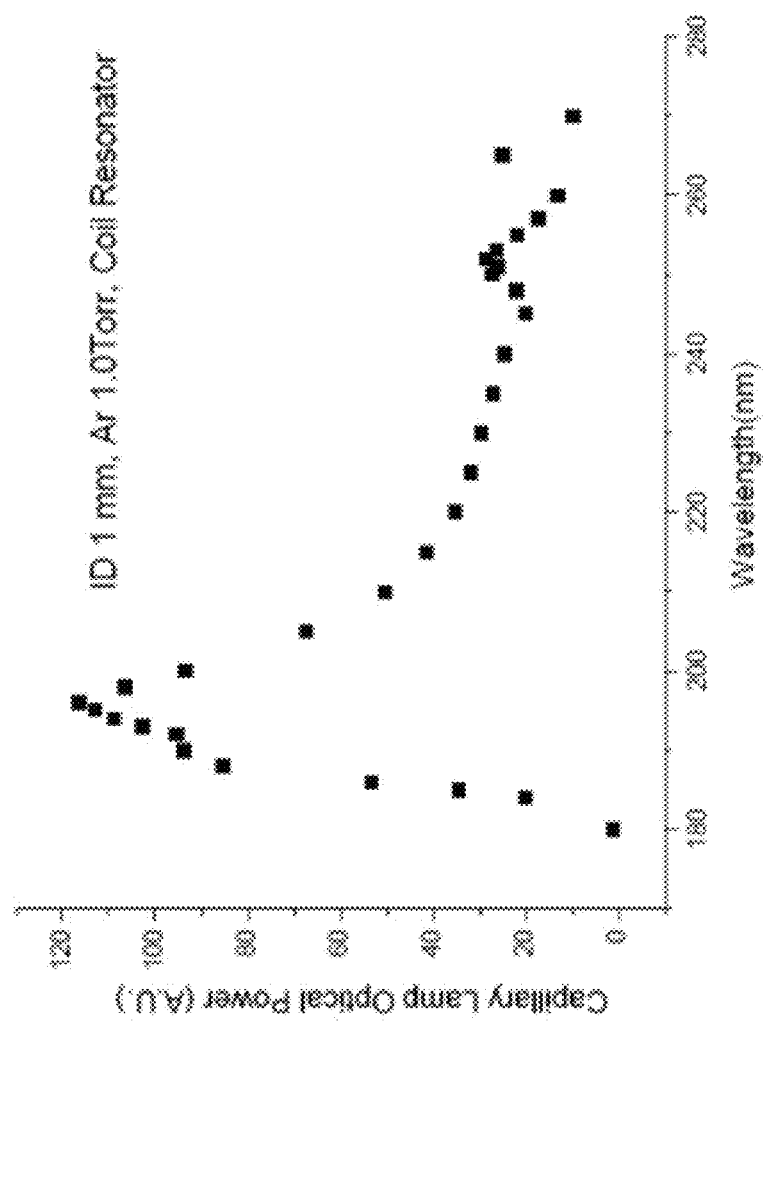
FIG. 6 is a graph illustrating optical power at a range of wavelengths for a 1 mm mercury capillary lamp, according to an embodiment of the present invention.

Several cylindrical mercury lamps with inner diameters of 0.25 mm (i e 250 microns) and 1 mm were fabricated. The resultant DUV/VUV spectra for a 250 micron lamp with argon buffer gas at 5 Torr and a 1 mm lamp with argon buffer gas at 1.0 Torr are shown in graphs 500 and 600 of FIGS. 5 and 6, respectively. For these lamps, a coil resonator was used. A piece of DUV/VUV fiber was attached to the lamp tube to deliver the light directly from the mercury plasma. The DUV light from the fiber was sent to a grating-based spectrometer to analyze the optical spectrum from 180 nm to 270 nm. As can be seen in FIGS. 4-6, the 194/254 power ratio increases dramatically in the capillary lamps compared to conventional 10 mm lamps. Several lamps were also fabricated with inner diameters between 0.05 mm and 1 mm that show similar results.

Due to the complex physics in a multi-species RF discharge lamp, a simple qualitative explanation is provided here. According to well established lamp theory, the temperature of the electrons is inversely proportional to the square of the inner diameter when thermal equilibrium is established. Smaller inner diameter lamps tend to require a higher breakdown voltage and more electrical power to sustain the plasma.

The 194 nm and 254 nm radiation primarily results from inelastic electron collisions with mercury ions and neutral atoms, respectively. As the electron temperature increases, the electrons have a higher probability to excite the ions to the P state, where the ions subsequently radiate 194 nm light when decaying to the ground S state. Another possible explanation is that the amount of mercury in the lamp dramatically affects the portion of ionized mercury and neutral mercury in the plasma. In addition, recent studies show that the sub-mm plasma (i.e., micro-plasma) may not reach thermal equilibrium during operation. The full quantitative physics picture of the micro-plasma dynamics, especially concerning the ionic and neutral atoms, is under investigation.

Lamp Design in Hollow-Core Fiber

Argon discharge and ultraviolet light guidance has been successfully demonstrated in hollow-core photonic crystal fiber (HCPCF) in several groups. Due to the difficulty of generating the 194 nm DUV/VUV wavelength for a mercury ion clock, the possible light intensity improvement provided by this new type of lamp is first theoretically estimated. For capillary lamps, the effective collecting angle of the fiber decreases rapidly as the length of the capillary increases. As a result, the total amount of collected light does not grow in proportion to increases in plasma length.

Figure 7:
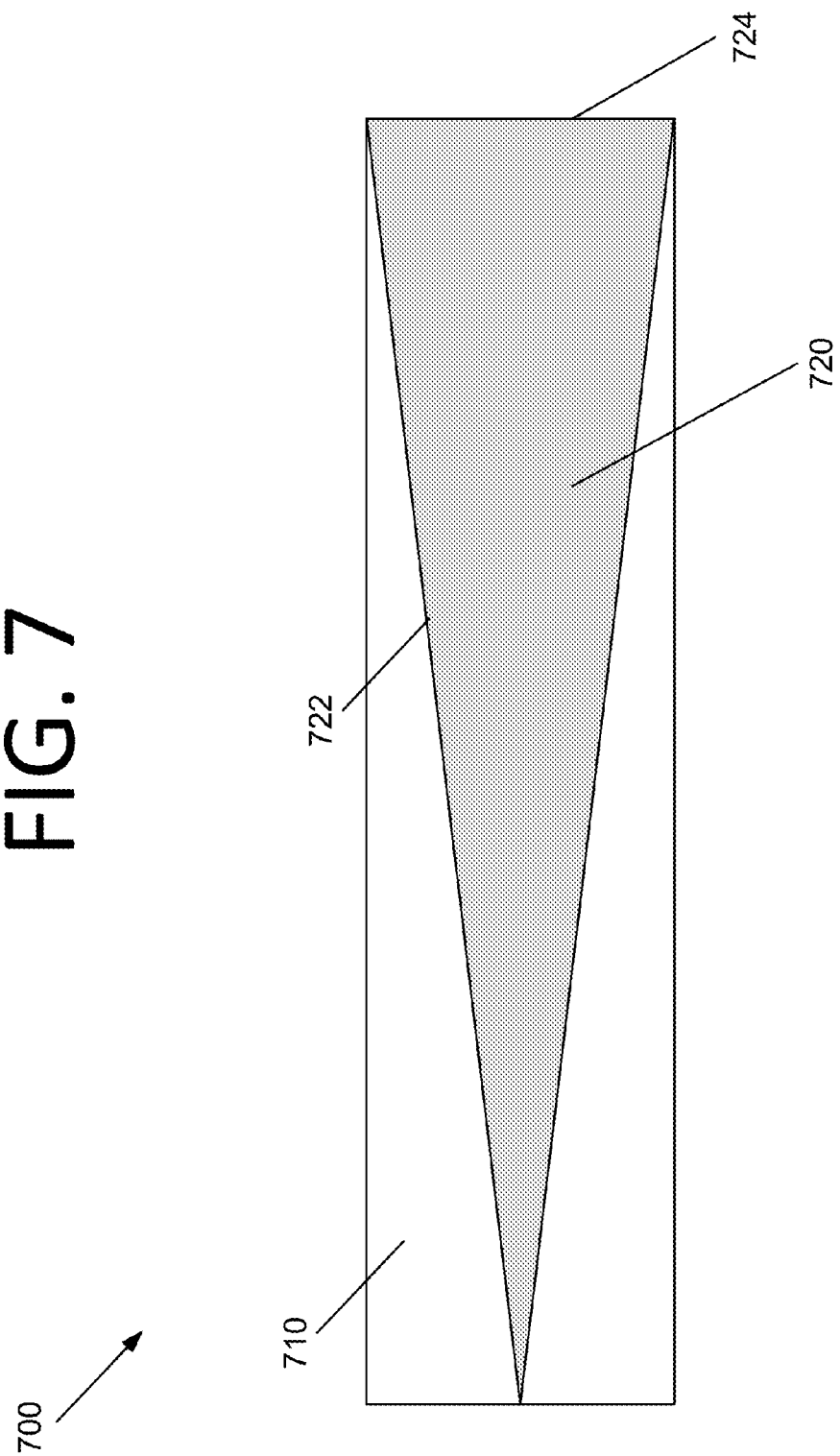
FIG. 7 is a side cutaway view illustrating a cone-based lamp and waveguide cross-section, according to an embodiment of the present invention.

A cone-based lamp is also designed, where a cone-shaped waveguide is inserted into the capillary tube where the mercury discharge plasma is generated. FIG. 7 is a side cutaway view illustrating a cone lamp and waveguide cross-section 700, according to an embodiment of the present invention. Inner volume 710 of the capillary is where the mercury discharge plasma is generated. Cone-shaped waveguide 720 is inserted into inner volume 710 of the capillary. Cone-shaped waveguide 720 may be glass or any other suitable material. The light is collected at surface 722 of cone-shaped waveguide 720, which is total-internally reflected and guided by cone-shaped waveguide 720 to output plane 724 on the right. In this way, cone-shaped waveguide 720 collects light that fulfills the total-internal-reflection condition, collecting more light than possible with a capillary lamp alone. As the cone capillary length increases, there is additional attenuation for the VUV/DUV light propagating in cone-shaped waveguide 720, depending on the glass material and ray path.

Figure 8:
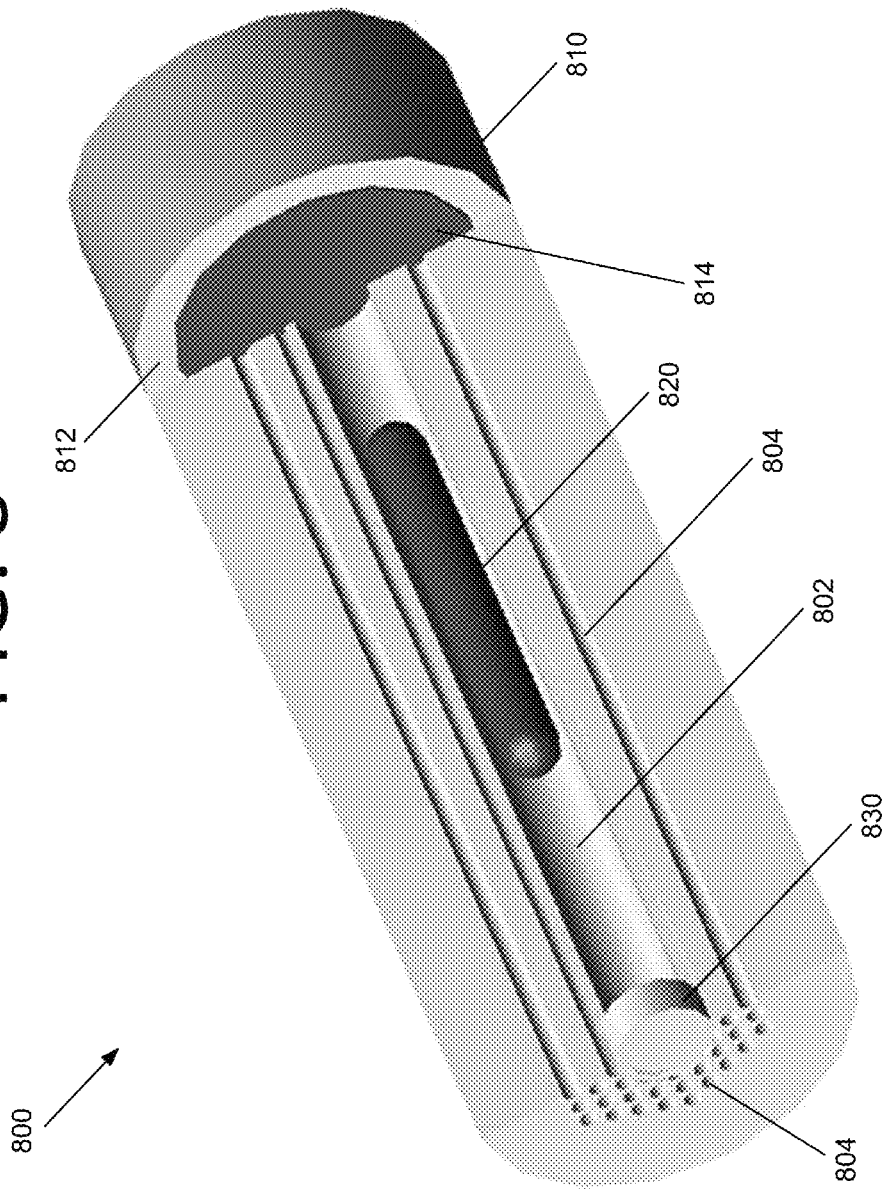
FIG. 8 is a perspective cutaway view illustrating a HCPCF mercury lamp integrated with a DUV/VUV fiber on the right end, according to an embodiment of the present invention.

FIG. 8 is a perspective cutaway view illustrating a HCPCF mercury lamp 800 integrated with a DUV/VUV fiber 810 on the right end, according to an embodiment of the present invention. DUV/VUV fiber 810 includes a cladding 812 and a higher index layer 814 where the light is finally collected for output. Mercury micro-plasma 820 provides light to DUV/VUV fiber 810. On the left side, a hollow core 802 of HCPCF mercury lamp 800 is vacuum sealed with a cap 830 by high temperature flame. Air hole structures 804 of HCPCF mercury lamp 800 are also shown.

Figure 9:
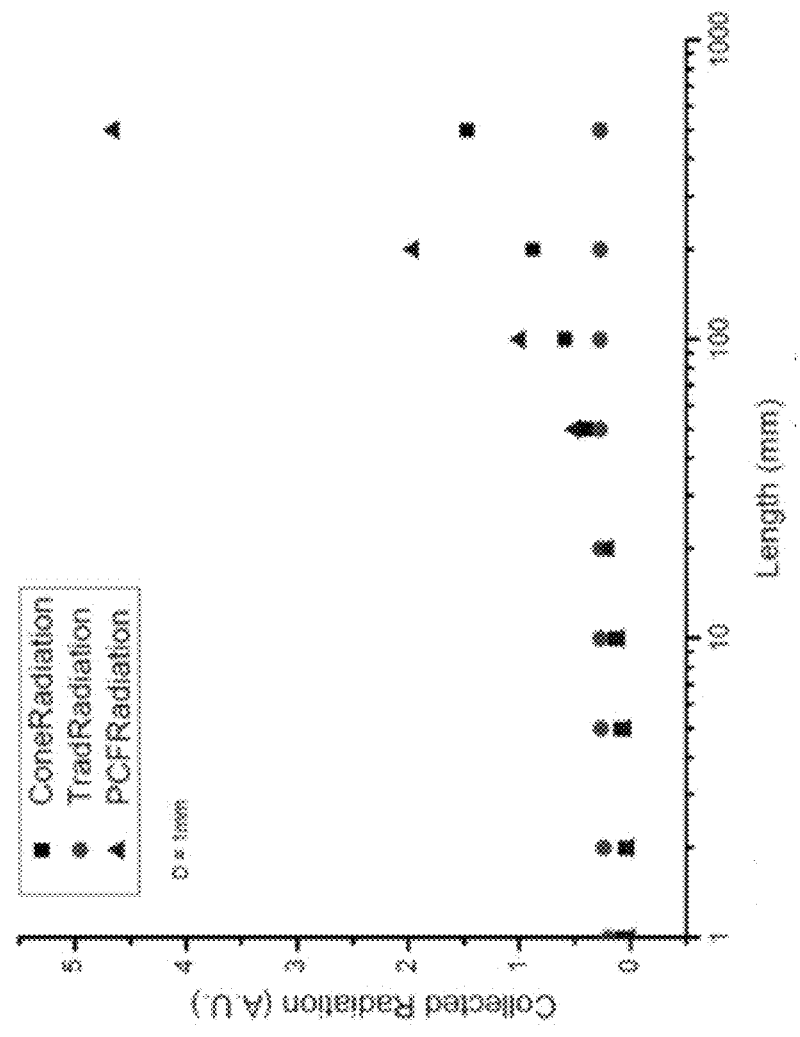
FIG. 9 is a graph illustrating collected radiation versus length for the three lamp types, according to an embodiment of the present invention.

Due to the photonic band-gap (PBG) guiding effect provided by the grating-like microstructure (i.e., air holes 804) surrounding hollow core 802, light in hollow core 802 can be collected along DUV/VUV fiber 810 as long as the initial emission angle falls under the fiber numerical aperture (~0.2 in this embodiment). The attenuation of the light in DUV/VUV fiber 810 is determined by the PBG guiding loss, which is approximately 1.5 dB/m for most commercial HCPCF. A comparison of these three discharge lamp approaches is provided in graph 900 of FIG. 9. TradRadiation (circles) is the capillary lamp, ConeRadiation (squares) is the cone-based lamp, and PCFRadiation (triangles) is the HCPCF-based lamp. The inner diameter containing the mercury vapor is set to 1 mm for simplicity. As can be seen, the HCPCF discharge lamp may provide at least 10 times more intense light than the traditional lamp, and significantly more radiation than the cone-based lamp as well.

Figure 10:
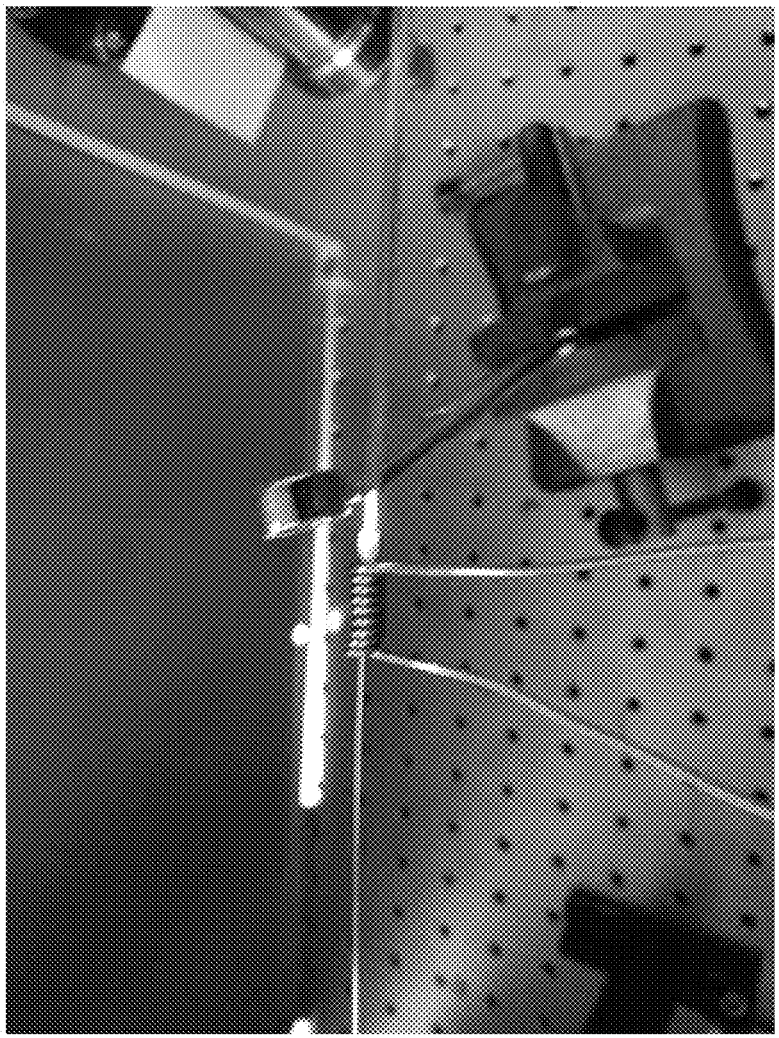
FIG. 10 is a photograph illustrating an experimental HCPCF test rig with plasma generation at the entrance, according to an embodiment of the present invention.

HCPCF with low loss at the DUV/VUV wavelength is not currently commercially available. To study the principle, a scheme is presented for light guidance of light from Hg—Ar discharge in HCPCF at ~700 nm. A piece of commercial HCPCF at visible wavelength was fusion-spliced to a broadband fiber that extends to DUV/VUV, forming a hermetic seal on the output end. The other end of the HCPCF was attached to an ultra-high vacuum (UHV) system with compatible vacuum glue. Mercury and argon were injected into the hollow core of the fiber, and an inductive resonator (coil) was wound around the HCPCF to generate RF gas discharge. Using this setup, plasma was generated at the entrance of the HCPCF, as shown in the center of photograph 1000 of FIG. 10, and visible light guidance was observed.

The diameter of the hollow-core is approximately 5 microns. The gas breakdown voltage and the RF power to sustain the plasma are expected to be high. Large-core HCPCF with band gaps at DUV/VUV wavelengths is under investigation. This allows more light at the desired wavelength and requires lower starting voltage and sustaining RF power.

Fiber Optics-Ions Spectroscopy

All the above lamps are related to fiber delivery. Accordingly, trapped mercury ion spectroscopy is presented with DUV/VUV fibers. Ten pieces of DUV/VUV fibers with a length of 1.5 m couple the light from a traditional mercury lamp to the ions in a quadrupole ion trap. The light was imaged onto the group of fibers and then passed to the trap through existing windows. The flexibility of the fibers allows the lamp to be positioned independently of the ion trap.

Figure 11:
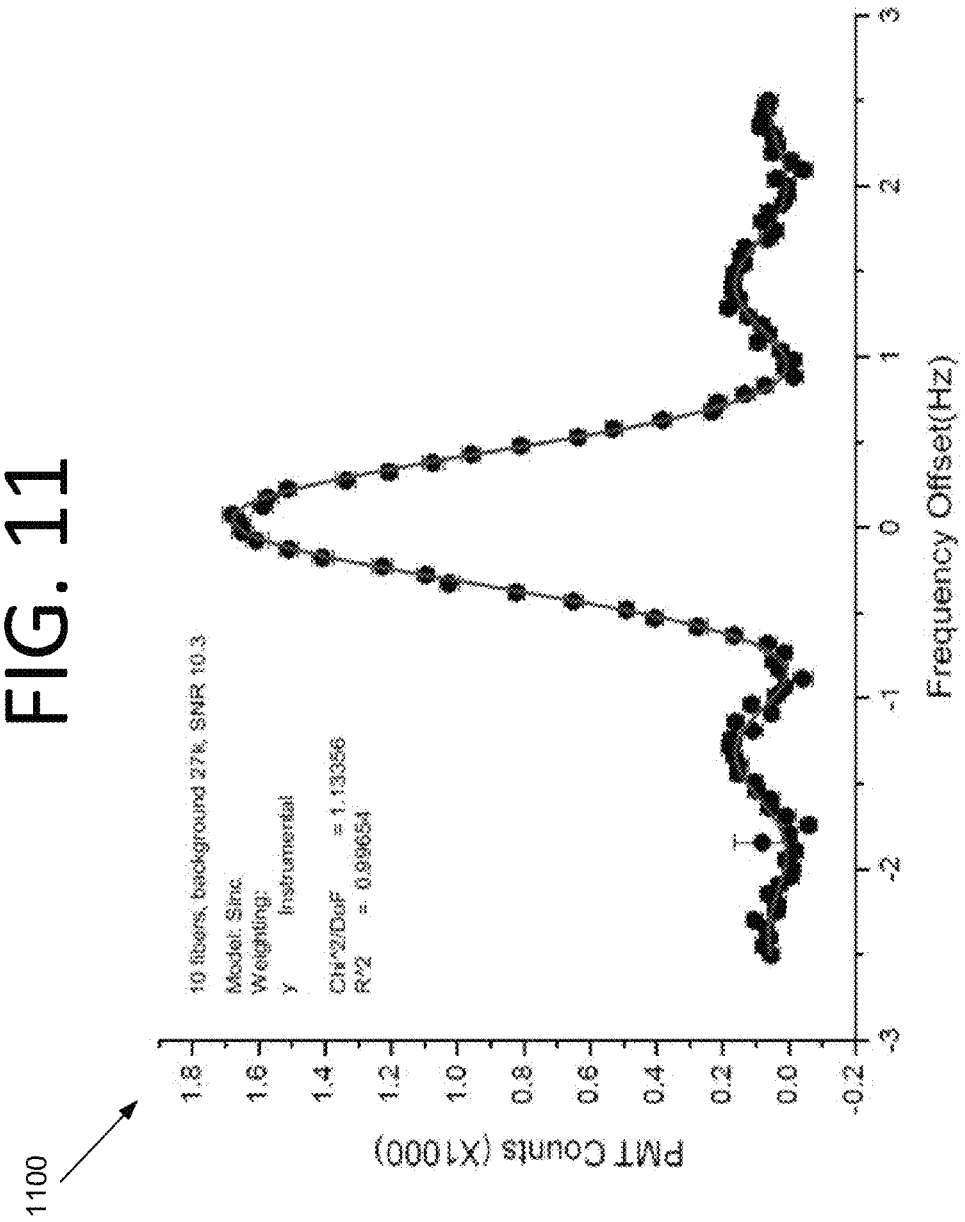
FIG. 11 is a graph illustrating PMT counts (×1000) versus frequency offset (Hz) at approximately 40.5 GHz for trapped mercury ions when 194 nm light is applied through fiber optics, according to an embodiment of the present invention.

A mercury ion clock signal using the fiber optic fibers to transport 194 nm light for optical pumping and state detection is shown in graph 1100 of FIG. 11. The SNR was approximately 10, which can be improved with more fibers. This demonstrates the functionality of the DUV/VUV fiber with existing ion trap systems, while providing a flexible optical interface. A dedicated ion trapping system has been constructed for the fiber optics and the fiber compatible sub-mm lamps. The trap ion spectroscopy can inversely serve as a sensitive probe to analyze the micro-plasma generated inside the capillary via fiber optics.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a capillary tube comprising a hollow inner section, the hollow inner section having a diameter of one millimeter or less;
a plasma source contained within the hollow inner section;
a buffer gas contained within the hollow inner section at a predetermined pressure; and,
a gradient index lens located at an output end of the optical fiber, the gradient index lens configured to deliver condensed and quasi-collimated light.

2. The apparatus of claim 1, wherein
the plasma source comprises mercury, rubidium, cesium, ytterbium, or cadmium, and
the buffer gas is pressurized to a pressure required to achieve a desired signal-to-noise ratio (SNR) using the plasma source.

3. The apparatus of claim 1, further comprising:
a deep ultraviolet (DUV)/vacuum ultraviolet (VUV) optical fiber operably connected to an end of the capillary tube, the optical fiber configured to receive light generated by the plasma source and guide the light through the optical fiber for use.

4. The apparatus of claim 3, further comprising:
a cap located at an opposite end of the capillary tube with respect to the optical fiber, wherein
the cap, together with the optical fiber, configured to seal the plasma source and the buffer gas within the capillary tube.

5. The apparatus of claim 1, further comprising an energy source configured to apply radio frequency (RF) or microwave energy to convert the plasma source into light-emitting plasma.

6. The apparatus of claim 5, further comprising:
inductive coils or surface strip electrodes configured for use as an RF or microwave inductive/capacitive resonator to sustain the plasma source in a plasma state.

7. The apparatus of claim 1, wherein the diameter of the hollow inner section is 250 microns or less and the buffer gas is pressurized to at least 5 Torr.

8. The apparatus of claim 1, wherein the plasma source comprises mercury configured to emit 194 nm light from mercury ions for ion clock applications.

9. The apparatus of claim 1, further comprising:
a cone-shaped waveguide located within the hollow inner section proximate to where plasma is generated by the plasma source.

10. The apparatus of claim 9, wherein light emitted by the plasma source is collected at a surface of the cone-shaped waveguide and total-internally reflected and guided by the cone-shaped waveguide to an output plane.

11. An apparatus, comprising:
a capillary tube comprising a hollow inner section;
a plasma source contained within the hollow inner section;
a buffer gas contained within the hollow inner section at a predetermined pressure;
a cone-shaped waveguide located within the hollow inner section proximate to where plasma is generated by the plasma source; and
a deep ultraviolet (DUV)/vacuum ultraviolet (VUV) optical fiber operably connected to an end of the capillary tube, the optical fiber configured to receive light generated by the plasma source and guide the light through the optical fiber for use.

12. The apparatus of claim 11, wherein a diameter of the hollow inner section is one millimeter or less.

13. The apparatus of claim 11, wherein
the plasma source comprises at least mercury, rubidium, cesium, ytterbium, or cadmium, and
the buffer gas is pressurized to a pressure required to achieve a desired signal-to-noise ratio (SNR) using the plasma source.

14. The apparatus of claim 11, further comprising:
a gradient index lens located at an output end of the optical fiber, the gradient index lens configured to deliver condensed and quasi-collimated light.

15. The apparatus of claim 11, further comprising:
a cap located at an opposite end of the capillary tube with respect to the optical fiber, wherein
the cap, together with the optical fiber, is configured to seal the plasma source and the buffer gas within the capillary tube.

16. The apparatus of claim 11, wherein a diameter of the hollow inner section is 250 microns or less and the buffer gas is pressurized to at least 5 Torr.

17. The apparatus of claim 1, wherein the plasma source comprises mercury configured to emit 194 nm light from mercury ions for ion clock applications.

18. The apparatus of claim 11, wherein light emitted by the plasma source is collected at a surface of the cone-shaped waveguide and total-internally reflected and guided by the cone-shaped waveguide to an output plane.

\* \* \* \* \*